Figure 6:
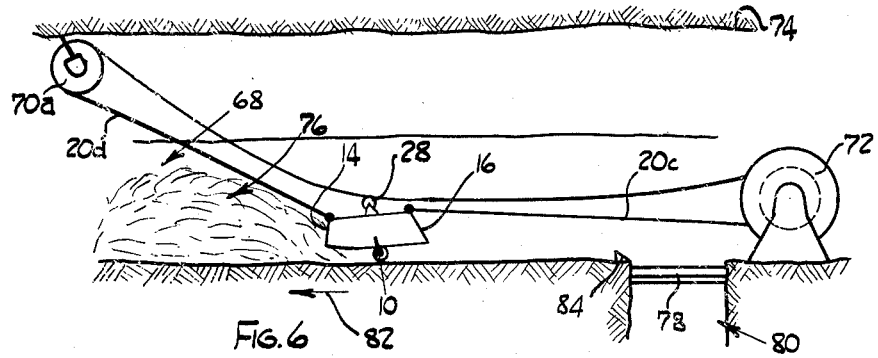

Oct. 12, 1965 T. WATT 3,210,870
SCRAPER SHOVEL SUITABLE FOR USE WITH A SCRAPER WINCH
Filed March 25, 1963 2 Sheets-Sheet 1
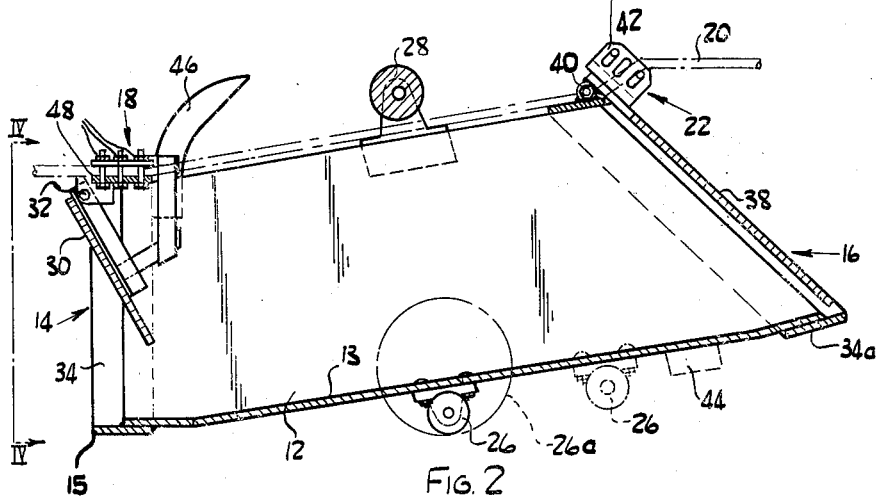
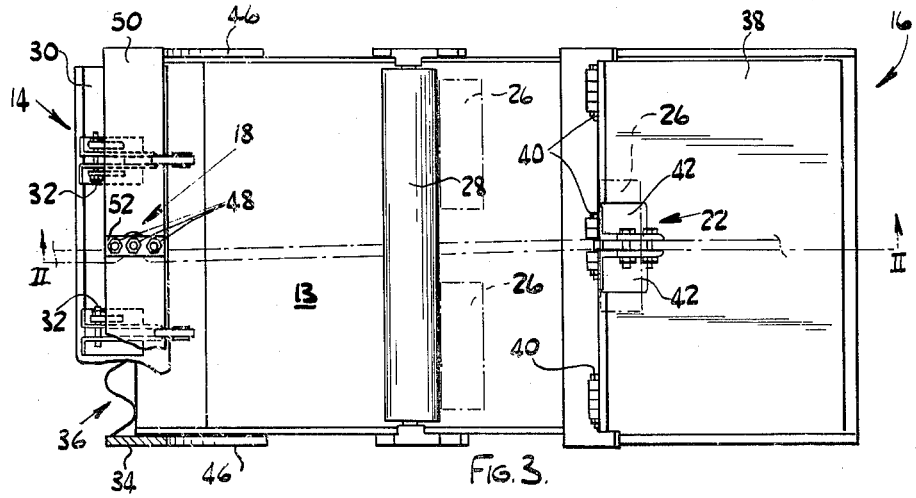
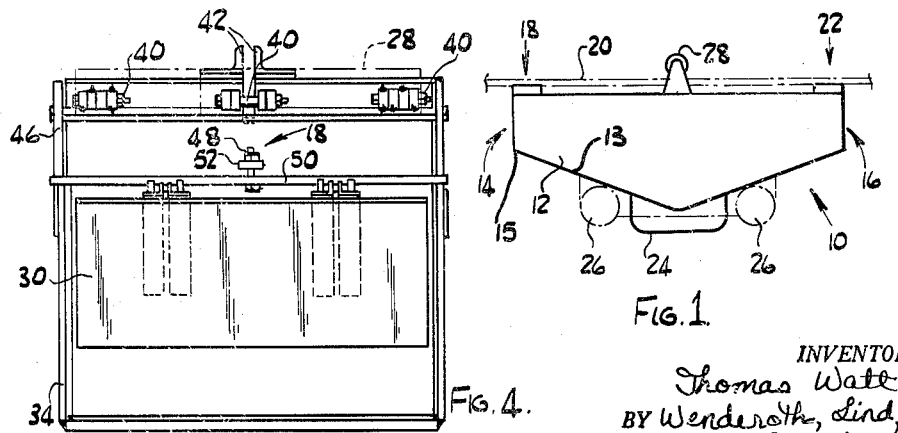
INVENTOR.
Thomas Watt
BY Wenderoth, Lind,
and Ponack,
Attorneys INVENTOR.
Thomas Watt
BY Wenderoth, Lind,
and Ponack,
Attorneys United States Patent Office 3,210,870
Patented Oct. 12, 1965

3,210,870
SCRAPER SHOVEL SUITABLE FOR USE WITH A SCRAPER WINCH
Thomas Watt, Parktown North, Transvaal, Republic of South Africa (P.O. Box 7837, Johannesburg, Transvaal, Republic of South Africa)
Filed Mar. 25, 1963, Ser. No. 267,552
Claims priority, application South Africa, Mar. 27, 1962, 624,487
5 Claims. (Cl. 37—125)

This invention relates to a scraper shovel suitable for use with scraper winches, in the scraping of loose material, for example broken rock or ore in mining operations.

According to the invention a scraper shovel includes a trough-shaped body having a floor, a pair of laterally spaced side walls projecting upwardly from the floor, a front end, a rear end, and a feed lip attached to the front end of the floor; roller means attached to the body below the floor and below the centre of gravity of the body and mounted to rotate about a transverse axis, and adapted to support the body in equilibrium but adapted to permit the body to tilt out of equilibrium about the roller axis to cause the feed lip to tilt into a digging position; a depending swing door at the rear end of the body and pivotally mounted about a transverse axis above the level of the floor for pivotal outward displacement for opening; rear rope-attachment means on the swing door and at a level above the pivotal axis of the swing door and adapted for attachment to a return which rope and adapted to receive pull in a longituidnal direction away from the front end and tranversely to the swing door pivotal axis; and front rope-attachment means at the front end of the body and at an elevation about the same as the rear rope-attachment means and adapted for attachment to a winch rope and adapted to receive pull in a direction opposite to that for the rear rope-attachment means.

Instead of roller means there may be provided wheels spaced laterally on either side of the body part. The scraper may have a further roller disposed rearwardly of the pair of rollers and mounted to rotate about an axis parallel to their rotational axis. In addition, there may be provided a depending swing gate at the front end of the body part, pivotally mounted about an elevated transverse axis and adapted to swing inwardly and upwardly about the pivotal axis to open the front end.

The scraper may include at least one return-rope roller mounted transversely over the body part, the top of the return-rope roller being at an elevation higher than the front and rear rope attachment means.

The scraper shovel may include at least one upwardly projecting abutment shoulder at the front end of the body part, the abutment shoulder conveniently comprising a pair of laterally spaced horns fast with the body part.

At least the front end of the body part may be provided with an abrasive resistant cast metal digging head which is channel-shape in front elevation. The digging head may have teeth at least along the lower edge.

In order to obtain greater tractive effort on the shovel, the front rope-attachment means may include a rope deflecting sheave, whereby double purchase of steel wire rope is obtained.

It will be clear that the digging head is made replaceable so that it can be replaced when worn.

Figure 5:
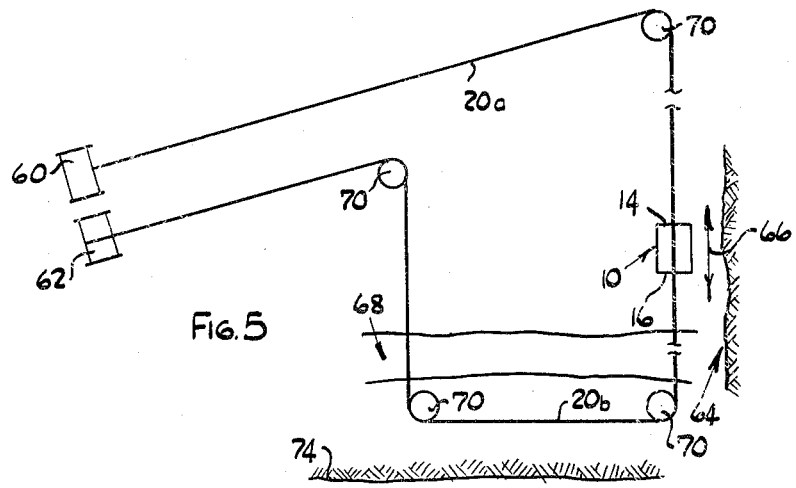
Figure 8:
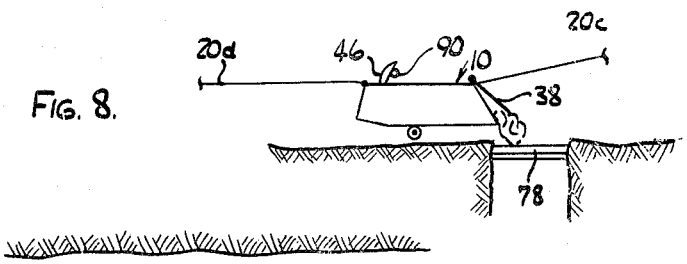
Figure 7:
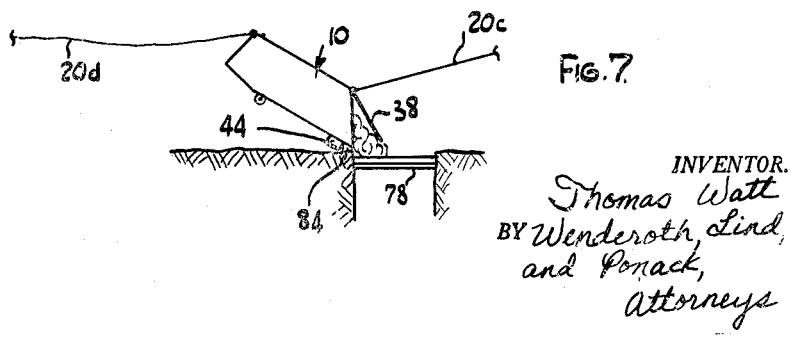

Particular embodiments of the invention will now be described with reference to the accompanying drawings.
In the drawings:
FIGURE 1 shows diagrammatically a side elevation of an embodiment of the invention;
FIGURE 2 shows a sectional side elevation at II—II in FIGURE 3 of another embodiment;
FIGURE 3 shows a partial top plan corresponding to FIGURE 2;
FIGURE 4 shows a rear end view at IV—IV in FIGURE 2, but with the return rope roller shown dotted;
FIGURE 5 shows diagrammatically a plan view of a scraper winch installation for face scraping;
FIGURE 6 shows diagrammatically a side elevation of a scraper winch installation arranged for gulley scraping;
FIGURE 7 shows a side elevation of a scraper shovel in unloading position, in workings having ample head room; and
FIGURE 8 shows a side elevation of a scraper in unloading position in workings having restricted head room.

Referring to FIGURE 1 of the drawings reference numeral 10 refers generally to a scraper shovel having a body part 12 having a floor 13, a front end 14, and a rear end 16. The front end 14 has a feed lip 15, and also has rope-attachment means 18 for attachment to a winch rope 20. Similarly, the rear end 16 has rope-attachment means 22 for attachment to the same rope returning to the winch, or to any other return rope of a winch.

The body part 12 may have a skid member 24, below its centre of gravity for sliding along a working face or gulley. Alternatively, there may be provided at least one pair of wheels 26a or rollers 26, mounted to rotate about a transverse axis, disposed under the centre of gravity of the body part. As a further alternative, two pairs of rollers 26 may be provided, mounted to rotate about a pair of longitudinally spaced tranverse axes, disposed front and rear of the centre of gravity in such a way that the body part can be tilted out of its equilibrium position by a pull exerted at either end of the body part.

If the shovel is to be used for gulley scraping, where a return rope will be passing above it, then a return rope roller 28 may be provided on top of the scraper, in order to support the return rope.

Referring now to FIGURES 2, 3, and 4 of the drawings, there is shown a sectional side elevation of another embodiment of the invention, having a depending gate 30 pivotally mounted about an elevated transverse axis, that is, about the axis of pins 32, the gate being adapted to swing about the axis, into the body part and upwardly thereby to open the front end of the shovel. The front end of the shovel is further provided with a vanadium cast steel digging head 34, of channel-shape in front elevation. The digging head may have teeth 36, at least along its lower edge.

The rear end of the body part 12, is provided with a depending door 38, mounted to pivot about an elevated transverse axis, namely about the axis of coaxial bolts 40. The rear rope-attachment means, includes a pair of laterally spaced angle brackets 42 adapted to receive a winch rope between them. The door 38, may be raised to the open position, when the rope 20 or a return rope attached to the rear rope-attachment means rises when the shovel approaches an elevated deflection sheave (not shown). The rear end of the shovel, may also be provided with an abrasive resistant cast metal digging head 34a, which may also have teeth if desired.

There may further be provided if desired, a digging heel 44 to facilitate the tilting of the scraper shovel, when discharging. Such a digging heel may be used, where ample head room is available, to permit tilting of the shovel for discharging. Where, however, the head room is restricted, then the shovel may be arranged to discharge, by causing it to run along, and by arresting its motion suddenly, whereby its load will be caused to slide out for discharge. Means may be provided for arresting the motion suddenly and may conveniently be a resilient abutment such as for example a steel wire rope 90, stretched between a pair of laterally spaced supports on either side of the shovel runway, the rope being positioned to engage with an abutment shoulder or shoulders provided on the scraper shovel. The abutment shoulders, may conveniently comprise a pair of laterally spaced horns 46. It must be emphasized, that the provision of the horns is optional, and is provided, for the special circumstances mentioned.

The shovel is supported upon a pair of laterally spaced rollers 26, mounted to rotate about a transverse axis, disposed substantially under the centre of gravity of the shovel, when loaded. The front rope attachment means 18, comprises a set of three bolts 48, spaced longitudinally in series, and having their axes disposed transversely to the axis of the rope 20. The rope is threaded through the spaces defined between adjacent pairs of bolts, and the rope is then clamped between a transverse plate 50 and a clamping plate 52, by means of the bolts 48.

Referring now to FIGURE 5 of the drawings, a scraper winch layout, is shown diagrammatically in plan view, the scraper shovel 10 having a working rope 20a attached to its front end 14, and a return rope 20b attached to its rear end 16. The ropes are wound on and off the double drums 60 and 62 of a scraper winch.

Operation of the scraper winch, displaces the scraper shovel 10 along the working face 64, in the direction of arrow 66, and delivers rock or ore, into gulley 68. The ropes 20a and 20b, are deflected around deflecting sheaves of snatch blocks 70, which are repositioned periodically, so as to bring the working zone of the scraper shovel, close to the working face 64.

Referring to FIGURE 6 of the drawings, there is shown a side elevation, of a scraper winch installation, arranged for gulley scraping in gulley 68. A double drum winch 72 is provided, the rope 20c being wound on one of the drums of the winch, and being attached to the rear end 16 of the scraper shovel 10. The other rope 20d, is attached to the front end 14 of the scraper shovel, and is deflected around snatch block 70a, suspended from the hanging wall 74. The rope, after deflection around the snatch block 70a, passes back towards the winch, and passes onto the other drum of the winch. In passing back to the winch 72, the rope 20d can derive support from the return rope roller 28, provided on the scraper shovel 10.

In operation, the installation will be suitable for delivering rock or ore disposed in a pile or heap 76, for transporting that rock or ore, and for discharging it onto grizzly bars 78, over an ore pass 80; or for discharging it, into a chute (not shown) discharging onto a conveyor belt (not shown).

In operation, the winch 72 is operated, to apply a tensile load to the rope 20d, whereby the scraper shovel is displaced in the direction of arrow 82, the shovel being thereby caused to dig with its front end into the broken rock, and so becoming loaded. Once it has been loaded, the winch 72 is operated, so as to apply a tensile load to the rope 20c. The scraper shovel 10 is thereupon displaced, until it can be caused to discharge where required.

Different discharge techniques may be used, depending upon the amount of head room available. Referring to FIGURE 7 of the drawings, there is shown an installation, where ample head room is available. The rear end of the scraper shovel 10 is caused to abut against the shoulder 84 thus causing the whole scraper shovel to tilt and the door 38 to open, and thereby causing the shovel to discharge. At this point, the rope 20c is arranged to be rising, thereby lifting the door 38, and thereby opening the rear end of the scraper shovel. In order to assist the digging in of the shovel, there may be provided a transverse digging heel 44, adapted to abut against the shoulder 84 provided next to the point of discharge. After discharge, the scraper shovel is pulled back to its charging point, to be loaded with a further load.

Referring to FIGURE 8 of the drawings, when it is necessary to discharge in working regions, having limited head room, the digging heel 44, may be dispensed with, and instead there may be provided abutment shoulders conveniently in the form of a pair of laterally spaced horns 46, fast with the front end of the body part. These horns are then adapted to abut against an abutment 90 arranged close to the discharge point. The abutment 90, is conveniently resilient, and may be provided by a steel wire rope, stretched between a pair of laterally spaced posts, one on either side of the travelling run of the scraper shovel.

In use, the scraper shovel will be displaced towards its discharge point, at a fair speed, and when its motion is suddenly arrested, by the horns 46, coming into contact with the resilient abutment member 90, the momentum of the material contained within the shovel, will be sufficient to cause its discharge, through the rear end of the scraper shovel, the door 38 having been raised by the rising rope 20c.

An advantage of this invention, is that it can be modified to suit various conditions. It can be used advantageously in coal mines, for the scraping of coal, without causing excessive breakage. It has the further advantage, that its discharge may be controlled (see FIGURE 7) by suitably choosing the slope of the floor of the body part, and by causing the door to flap back and forth, to restrict the sudden outflow of rock. Such control, will be useful, particularly where discharge is to take place into a bin, arranged to feed a conveyor belt, disposed below it.

If desired, the front end of the scraper 10, may be provided with a pulley, such that the rope 20d, will then be passed around the pulley, and its end anchored some distance away beyond the pile of rock 76. Such an arrangement then, will provide a double purchase to the rope 20d and greater loading force will be available, for loading the shovel.

I claim:

1. A scraper shovel which includes a trough-shaped body having a floor, a pair of laterally spaced side walls projecting upwardly from the floor, a front end, a rear end, and a feed lip attached to the front end of the floor; roller means attached to the body below the floor and below the center of gravity of the body and mounted to rotate about a transverse axis, and adapted to support the body in equilibrium but adapted to permit the body to tilt out of equilibrium about the roller axis to cause the feed lip to tilt into a digging position; a depending swing door disposed at the rear end of the body and pivotally connected thereto adjacent the top of the side walls for pivotal outward displacement about a transverse axis, rear rope attachment means on the swing door at a level above the transverse pivotal axis of the swing door and adapted for attachment to a return winch rope, and adapted to receive pull in a longitudinal direction away from the front end and transversely to the swing door pivotal axis; and front rope-attachment means at the front end of the body and at an elevation about the same as the rear rope-attachment means and adapted for attachment to a winch rope and adapted to receive pull in a direction opposite to that the rear rope-attachment means.

2. A scraper shovel which includes a trough-shaped body having a floor, a pair of laterally spaced side walls projecting upwardly from the floor, a front end, a rear end, and a feed lip attached to the front end of the floor; roller means attached to the body below the floor and below the center of gravity of the body and mounted to rotate about a transverse axis, and adapted to support the body in equilibrium but adapted to permit the body to tilt out of equilibrium about the roller axis to cause the feed lip to tilt into a digging position; a depending swing door disposed at the rear end of the body and pivotally connected thereto adjacent the top of the side walls for pivotal outward displacement about a transverse axis, rear rope attachment means on the swing door at a level above the transverse pivotal axis of the swing door and adapted for attachment to a return winch rope, and adapted to receive pull in a longitudinal direction away from the front end and transversely to the swing door pivotal axis; front rope-attachment means at the front end of the body and at an elevation about the same as the rear rope-attachment means and adapted for attachment to a winch rope, and adapted to receive pull in a direction opposite to that for the rear rope-attachment means; a depending swing gate at the front end of the body and pivotally hung over the feed lip and between the side walls about a transverse axis and adapted to swing inwardly and upwardly between the side walls to open the front end of the body; and stop means to limit the outward displacement of the swing gate about its pivotal axis to a closed position over the feed lip.

3. A scraper shovel which includes a trough-shaped body having a floor, a pair of laterally spaced side walls projecting upwardly from the floor, a front end, a rear end, and a feed lip attached to the front end of the floor; roller means attached to the body below the floor and below the center of gravity of the body and mounted to rotate about a transverse axis, and adapted to support the body in equilibrium but adapted to permit the body to tilt out of equilibrium about the roller axis to cause the feed lip to tilt into a digging position; a depending swing door disposed at the rear end of the body and pivotally connected thereto adjacent the top of the side walls for pivotal outward displacement about a transverse axis, rear rope attachment means on the swing door at a level above the transverse pivotal axis of the swing door and adapted for attachment to a return winch rope, and adapted to receive pull in a longitudinal direction away from the front end and transversely to the swing door pivotal axis; front rope-attachment means at the front end of the body and at an elevation about the same as the rear rope-attachment means and adapted for attachment to a winch rope, and adapted to receive pull in a direction opposite to that for the rear rope-attachment means; and at least one upwardly projecting abutment shoulder at the front end of the body and projecting upwardly above the level of the front and rear rope attachment means, and adapted to abut against a stop positioned to limit longitudinal displacement of the shovel.

4. A scraper shovel which includes a trough-shaped body having a floor, a pair of laterally spaced side walls projecting upwardly from the floor, a front end, a rear end, and a feed lip attached to the front end of the floor; roller means attached to the body below the floor and below the center of gravity of the body and mounted to rotate about a transverse axis, and adapted to support the body in equilibrium but adapted to permit the body to tilt out of equilibrium about the roller axis to cause the feed lip to tilt into a digging position; a depending swing door disposed at the rear end of the body and pivotally connected thereto adjacent the top of the side walls for pivotal outward displacement about a transverse axis, rear rope attachment means on the swing door at a level above the transverse pivotal axis of the swing door and adapted for attachment to a return winch rope, and adapted to receive pull in a longitudinal direction away from the front end and transversely to the swing door pivotal axis, front rope-attachment means at the front end of the body and at an elevation about the same as the rear rope-attachment means and adapted for attachment to a winch rope, and adapted to receive pull in a direction opposite to that for the rear rope-attachment means; and a pair of laterally spaced rearwardly curving horns attached at the front end of the body to the side walls, and projecting upwardly above the level of the front and rear rope-attachment means, and adapted to abut against a stop positioned to limit longitudinal displacement of the shovel.

5. A scraper shovel which includes a trough-shaped body having a floor, a pair of laterally spaced side walls projecting upwardly from the floor, a front end, a rear end, and a feed lip attached to the front end of the floor; roller means attachted to the body below the floor and below the center of gravity of the body and mounted to rotate about a transverse axis, and adapted to support the body in equilibrium but adapted to permit the body to tilt out of equilibrium about the roller axis to cause the feed lip to tilt into a digging position; a depending swing door disposed at the rear end of the body and pivotally connected thereto adjacent the top of the side walls for pivotal outward displacement about a transverse axis, rear rope attachment means on the swing door at a level above the transverse pivotal axis of the swing door and adapted for attachment to a return winch rope, and adapted to receive pull in a longitudinal direction away from the front end and transversely to the swing door pivotal axis; front rope-attachment means at the front end of the body and at an elevation about the same as the rear rope-attachment means adapted for attachment to a winch rope, and adapted to receive pull in a direction opposite to that for the rear rope-attachment means and a digging heel attached at the rear end of the body below the floor and projecting downwardly.

References Cited by the Examiner

UNITED STATES PATENTS

| | | | |
|---|---|---|---|
| 163,849 | 6/75 | Church | 37—115 X |
| 263,986 | 9/82 | Starke | 37—135 |
| 493,421 | 3/93 | Butler | 37—136 |
| 798,596 | 9/05 | Callahan | 37—136 |
| 833,333 | 10/06 | Newman | 37—116 |
| 1,027,301 | 5/12 | Williams | 37—135 |
| 1,275,548 | 8/18 | French | 37—136 |
| 1,394,067 | 10/21 | Conner | 37—136 |
| 1,397,560 | 11/21 | Strange | 37—135 X |
| 2,119,780 | 6/38 | Curtis | 37—135 X |
| 2,588,657 | 3/52 | Pitts | 37—135 |

FOREIGN PATENTS 63,596   6/41   Norway.

ABRAHAM G. STONE, *Primary Examiner.*

BENJAMIN HERSH, WILLIAM A. SMITH III,
*Examiners.*